United States Patent
Minegar

(10) Patent No.: US 6,941,695 B2
(45) Date of Patent: Sep. 13, 2005

(54) FISHING LURE ASSEMBLY HAVING CONCEALED RETRACTABLE HOOKS

(76) Inventor: Kenneth Minegar, 5020 Cole St., San Diego, CA (US) 92117

( * ) Notice: Subject to any disclaimer, the term of this patent is extended or adjusted under 35 U.S.C. 154(b) by 0 days.

(21) Appl. No.: 10/382,341

(22) Filed: Mar. 4, 2003

(65) Prior Publication Data

US 2004/0172874 A1 Sep. 9, 2004

(51) Int. Cl.[7] .................... A01K 83/02; A01K 85/02
(52) U.S. Cl. .................................. 43/35; 43/34
(58) Field of Search ................... 43/34, 35, 36, 43/37

(56) References Cited

U.S. PATENT DOCUMENTS

| | | | | |
|---|---|---|---|---|
| 745,437 A | * | 12/1903 | Luther | 43/89 |
| 839,611 A | * | 12/1906 | Azor | 43/34 |
| 985,659 A | * | 2/1911 | Walter | 43/35 |
| 1,697,120 A | * | 1/1929 | Lee | 43/35 |
| 1,812,906 A | * | 7/1931 | Swearingen | 43/35 |
| 2,134,841 A | * | 11/1938 | Walter | 43/35 |
| 2,256,088 A | * | 9/1941 | Hogan | 43/35 |
| 2,381,231 A | * | 8/1945 | Spear | 43/35 |
| 2,396,366 A | * | 3/1946 | Forbess | 43/36 |
| 2,415,633 A | * | 2/1947 | William | 43/35 |
| 2,442,866 A | * | 6/1948 | Stein | 43/36 |
| 2,596,564 A | * | 5/1952 | Kautenberg | 43/35 |
| 2,810,230 A | * | 10/1957 | Dawson | 43/37 |
| 2,982,046 A | * | 5/1961 | Wilson | 43/35 |
| 3,117,389 A | * | 1/1964 | King | 43/35 |
| 3,646,699 A | * | 3/1972 | Zeman | 43/35 |
| 3,975,856 A | * | 8/1976 | Gadbois | 43/36 |
| 4,143,478 A | | 3/1979 | Nicholas et al. | |
| 4,176,489 A | | 12/1979 | Levstik | |
| 4,283,877 A | * | 8/1981 | Onstott et al. | 43/34 |
| 4,387,528 A | * | 6/1983 | Kahl | 43/36 |
| 4,442,622 A | | 4/1984 | Sartain | |
| 4,528,770 A | * | 7/1985 | McDiarmid | 43/35 |
| 4,562,661 A | | 1/1986 | Messinger et al. | |
| 4,726,142 A | | 2/1988 | Tapley | |
| 4,827,656 A | * | 5/1989 | Ohnishi | 43/34 |
| 4,873,781 A | | 10/1989 | Bates | |
| 4,947,574 A | | 8/1990 | Tapley | |
| 5,010,679 A | | 4/1991 | Tischer | |
| 5,367,818 A | | 11/1994 | Aduana | |
| 5,526,602 A | | 6/1996 | Day, Sr. | |
| 5,640,796 A | | 6/1997 | Barrows | |
| 5,809,685 A | * | 9/1998 | Mauldin | 43/35 |
| 5,822,911 A | * | 10/1998 | Cox | 43/37 |
| 5,890,314 A | * | 4/1999 | Peters | 43/36 |
| 6,266,916 B1 | | 7/2001 | Dugan | |

* cited by examiner

*Primary Examiner*—Peter M. Poon
*Assistant Examiner*—David J Parsley
(74) *Attorney, Agent, or Firm*—James P. Broder

(57) ABSTRACT

A fishing lure assembly (10) includes a first hook (26A), a bias (30) that urges the first hook (26A) in a first direction, and a latch (32). The fishing lure assembly (10) can also include an oppositely configured second hook (26B) that is urged in a second direction. The latch (32) can selectively inhibit movement of the first and/or second hooks (26A, 26B). The latch (32) can be biased in a third direction that is perpendicular to the first and/or second direction. Pressure on a hook section (43) of the first and/or second hook (26A) can cause the latch (32) to move in the third direction to release the first and/or second hook (26A, 26B).

32 Claims, 4 Drawing Sheets

FISHING LURE ASSEMBLY HAVING CONCEALED RETRACTABLE HOOKS

FIELD OF THE INVENTION

The present invention relates generally to a fishing lure having one or more movable, concealed hooks.

BACKGROUND

Artificial fishing lures used by anglers vary widely in their operation as well as their appearance. Lures generally simulate forms of animal life in order to encourage fish to bite at the lure. However, the hooks of these lures often become entangled or snagged when vegetation, rocks or other obstructions that are present in the water. In addition, the exposed hooks can cause injuries to a user of the lure.

Various attempts have been made to provide a fishing lure that does not snag on rocks or vegetation. Unfortunately, these attempts have not been altogether satisfactory. For example, fishing lures have been developed which have hooks which are hidden inside the lure body, and which are released by the angler pulling sharply on the fishing line. However, sometimes it is difficult for the fisherman to accurately time when the line must be pulled, or to know the difference between whether a fish has struck his bait or the lure has simply collided with a rock or other impediment. These and other types of lures have generally been somewhat complex in construction and may be difficult or unsafe to use.

In light of the above, there is a need for providing a fishing lure having concealed hooks. Still another need exists to provide a fishing lure having a hook assembly that is easier and safer to use. Yet another need exists to provide a fishing lure assembly that is relatively easy and cost effective to manufacture.

SUMMARY

The present invention is directed to a hook assembly for a fishing lure assembly. In one embodiment, the hook assembly includes a first hook, a bias that urges the first hook in a first direction, and a latch that selectively inhibits movement of the first hook toward the first direction. In this embodiment, pressure on the first hook in a direction that is substantially opposite the first direction releases the first hook from the latch, allowing the first hook to move in the first direction.

The hook assembly can also include a second hook. In this embodiment, the bias urges the second hook in a second direction that is different than the first direction. In another embodiment, the second direction is substantially opposite the first direction. Further, the latch selectively inhibits movement of the second hook in the second direction. Pressure on the second hook in a direction that is substantially opposite the second direction releases the second hook from the latch, allowing the second hook to move in the second direction. In an alternative embodiment, pressure on the first hook substantially toward the second hook causes the latch to release the first hook, allowing the bias to move the first hook in the first direction.

Additionally, the latch can be biased in a third direction that is different from the first direction and/or the second direction. In one embodiment, the third direction is substantially perpendicular to the first direction. Further, the one or more of the hooks can include a curved, hook section. In one embodiment, the pressure necessary to release the hook from the latch is applied to the hook section of the hook.

The present invention is also directed to a fishing lure assembly and a method for using a fishing lure assembly.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
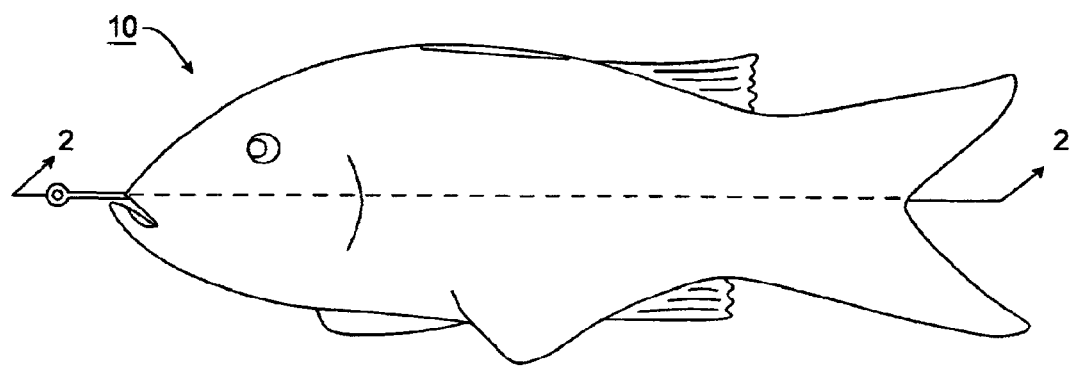
FIG. 1 is a side view of a fishing lure assembly having features of the present invention.
Figure 2:
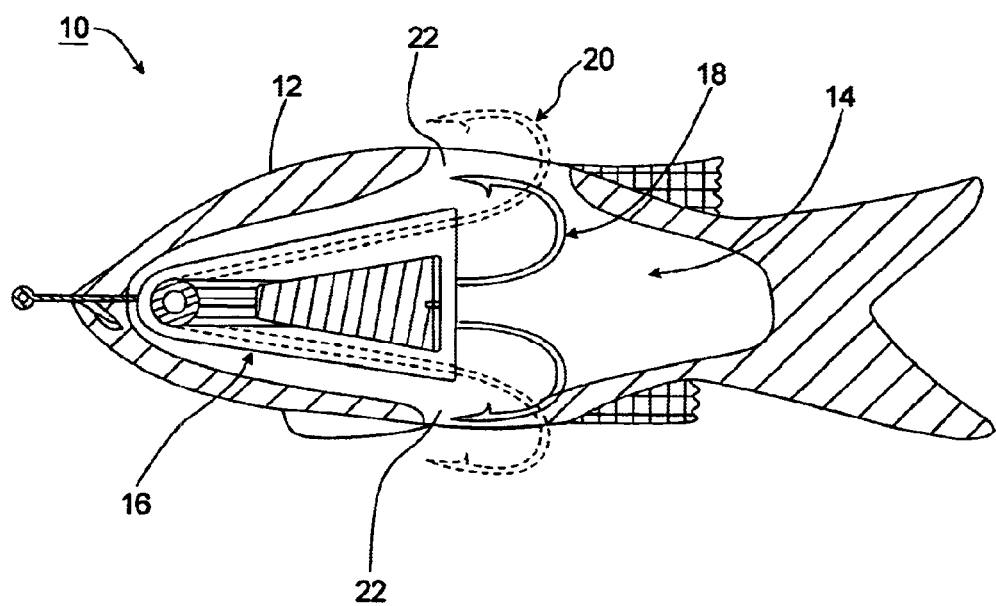
FIG. 2 is a cross-sectional view of the fishing lure assembly taken on line 2—2 in FIG. 1.

FIG. 1 illustrates a fishing lure assembly 10 having features of the present invention. FIG. 2 is a cross-sectional view of the fishing lure assembly 10 illustrated in FIG. 1. In this embodiment, the fishing lure assembly 10 includes (i) a lure body 12 having a body cavity 14, and (ii) a hook assembly 16 that is positioned at least partially within the body cavity 14. The lure body 12 substantially encircles the hook assembly 16 when the hook assembly 16 is in an engaged position 18 (illustrated by solid lines on FIG. 2), and allows a greater portion of the hook assembly 16 to extrude from the body cavity 14 when the hook assembly 16 is in a disengaged position 20 (illustrated in phantom on FIG. 2).

Stated another way, in one embodiment, the hook assembly 16 is substantially concealed within the body cavity 14 when in the engaged position 18, and at least a portion of the hook assembly 16 becomes exposed when in the disengaged position 20. In another embodiment, the entire hook assembly 16 is concealed within the body cavity 14 when the hook assembly 16 is in the engaged position 18. In still another embodiment, a portion of the hook assembly 16 is exposed when the hook assembly 16 is in the engaged position 18. In various embodiments, a greater portion of the hook assembly 16 is exposed when the hook assembly 16 is in the disengaged position 20 than when in the engaged position 18. With this design, in the engaged position 18, the hook assembly 16 is less likely to become snagged on vegetation or rocks. In addition, the fishing lure assembly 10 is safer to use because the hook assembly 16 is not exposed to the user when in the engaged position 18.

The lure body 12 can generally simulate a fish that attracts predators. The design of the lure body 12 can vary. As illustrated in FIG. 2, the lure body 12 can include one or more body apertures 22 that are sized and shaped to allow extension of a portion of the hook assembly 16 from the body cavity 14 through the one or more body apertures 22 to an exterior of the lure body 12. In one embodiment, each body aperture 22 is somewhat rectangular and/or slot-shaped. However, in other embodiments, each body aperture 22 can have a somewhat different configuration depending upon the design requirements of the hook assembly 16 and the lure body 12.

The shape, size and coloring of the lure body 12 can vary depending upon the type of predator sought to be caught, and/or in order to suit the design requirements of the hook assembly 16 and the fishing lure assembly 10. Moreover, the materials used to form the lure body 12 can vary. For example, rigid materials such as plastic, metal, and ceramic can be used. Alternatively, softer, resilient materials such as silicone, rubber or another suitable material, or a combination of any such materials can be used to form the lure body 12. The lure body 12 can be relatively rigid, or it can be flexible to simulate natural fish movements as the fishing lure assembly 10 moves through the water. In one embodiment, when using a relatively rigid lure body 12, a greater portion of the hook assembly 16 can be exposed when the hook assembly 16 is in the engaged position 18 than when using a more resilient material for the lure body 12, as explained in greater detail below. Additionally, the lure body 12 can include various markings (not shown) to simulate the look of certain baitfish, including but not limited to eyes, color patterns, gills, ridges, indentations and/or other characteristic markings or features of baitfish.

The design of the body cavity 14 can vary. In the embodiment illustrated in FIG. 2, the body cavity 14 is generally hollow and is sized and shaped to retain and substantially encircle at least a portion of the hook assembly 16. The body cavity 14 accommodates the required movement of the hook assembly 16 within the body cavity 14.

Figure 3:
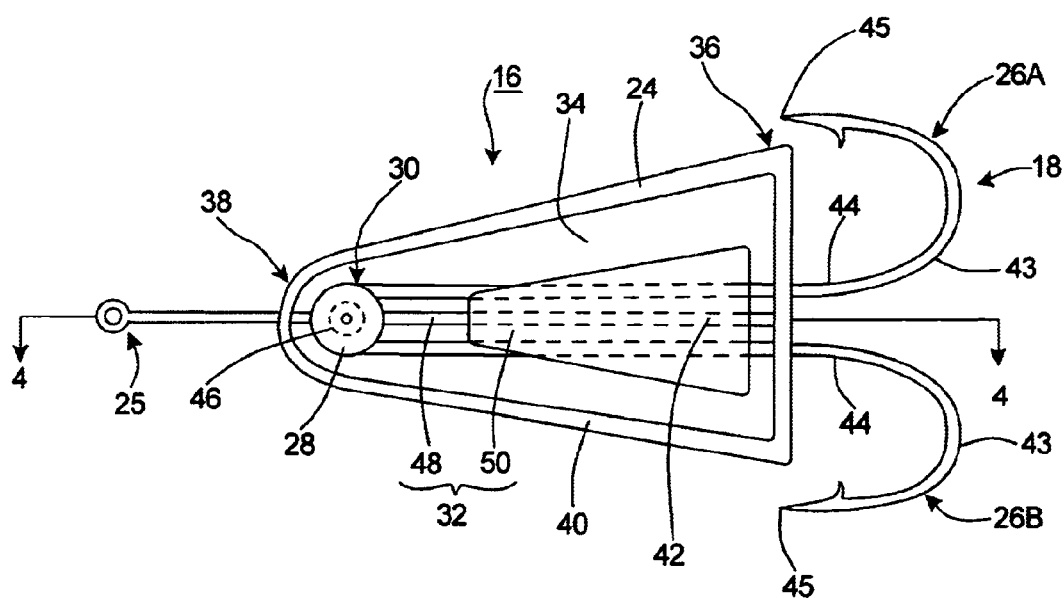
FIG. 3 is a side view of a hook assembly having features of the present invention.

FIG. 3 illustrates an embodiment of the hook assembly 16 in the engaged position 18. The hook assembly 16 engages the predator fish. The design of the hook assembly 16 can vary depending upon the design requirements of the fishing lure assembly 10 (illustrated in FIG. 2) and the lure body 12 (illustrated in FIG. 2). In the embodiment illustrated in FIG. 1, the hook assembly 16 includes an assembly body 24, a line attachment 25, one or more hooks including a first hook 26A and a second hook 26B, a shaft 28, a bias 30, and a latch 32.

The assembly body 24 can include a recess 34 that protects the remainder of the hook assembly 16 from contact with the lure body 12, which could otherwise interfere with movement of the hook assembly 16. Moreover, the assembly body 24 can be used to secure the hook assembly 16 to the lure body 12. The assembly body 24 is a somewhat plate-like structure that can vary in shape. In the embodiment illustrated in FIG. 3, the assembly body 24 has a somewhat triangular shape. Alternatively, the assembly body 24 can be rectangular, trapezoidal, oval, round or can have another polygonal-shaped configuration. In one embodiment, the assembly body 24 has a proximal region 36, a distal region 38, a flange 40 and a latch aperture 42 (shown in phantom in FIG. 3). The proximal region 36 is positioned somewhat near the hooks 26A, 26B, and the distal region 38 is positioned somewhat near the line attachment 25.

The flange 40 can extend completely or partially around the perimeter of the assembly body 24 to define a portion of the recess 34. Further, the flange 40 can be rounded or can have a somewhat bent radius to provide greater strength to the assembly body 24, which allows the assembly body to better inhibit interference with the movement of the remainder of the hook assembly 16.

The latch aperture 42 can be used as a guide for a portion of the latch 32. In one embodiment, a portion of the latch 32 extends through the latch aperture 42, as explained in greater detail below. The latch aperture 42 can be generally positioned midway between the hooks 26A, 26B, towards the proximal region 36 of the assembly body 24.

The line attachment 25 provides a location for attachment of a fishing line (not shown) to the fishing lure assembly 10. The line attachment 25 can be an eyelet, a closed hook, or any other suitable region onto which a fishing line can be secured. In one embodiment, the line attachment 25 can be secured to the shaft 28. In alternative embodiments, the line attachment can be secured to another portion of the hook assembly 16 or to a portion of the lure body 12.

Although the hook assembly 16 illustrated in FIG. 3 includes two hooks 26A, 26B, greater or fewer than two hooks 26A, 26B can be utilized. Additionally, for ease of discussion herein, either hook 26A, 26B can be the first hook or the second hook. The size and shape of each hook 26A, 26B can vary depending upon the requirements of the hook assembly 16 and/or the fishing lure assembly 10. Each hook 26A, 26B can include a curved, hook section 43 and a substantially straight extension section 44. The hook section 43 can include a sharp, tapered end 45, also referred to as a barb. Alternatively, one or more of the hooks 26A, 26B can be barbless. At least a portion of the hook section 43 including the tapered end 45 extends through the body aperture 22 to "hook" a predator (not shown) when one or more hooks 26A, 26B are released from the latch 32. The extension section 45 is typically secured to the bias 30.

The hooks 26A, 26B are formed from one or more rigid materials which can include various metals, ceramics or carbon fiber, as non-exclusive examples. However, any suitably strong materials can be used to form the hooks 26A, 26B.

The shaft 28 couples the bias 30 and/or the latch 32 to the assembly body 24. The shaft 28 can be a pin, a rivet, a screw, a post or any other similar suitable structure. Further, the number of shafts 28 can vary. For example, the hook assembly 16 can include a single shaft 28, as illustrated in FIG. 3. Alternatively, the hook assembly 16 can include a plurality of shafts 28. In one embodiment, the bias 30 is positioned around one shaft 28, while the line attachment 25 and/or the latch 32 are positioned around one or more separate shafts (not shown).

In the embodiment illustrated in FIG. 3, the bias 30 is secured to one or more of the hooks 26A, 26B. For example, one or more of the hooks 26A, 26B can be spot-welded to the bias 30. Alternatively, other suitable methods for bonding the hooks 26A, 26B to the bias 30 can be utilized. In still an alternative embodiment, one or more of the hooks 26A, 26B can be formed as a unitary structure with the bias 30.

The bias 30 can include a spring 46 (illustrated in phantom in FIG. 3) that is positioned at least partially around the shaft 28. For example, the spring 46 can include one or more turns about the shaft 28. The bias 30 can bias the first hook 26A in a first direction and the second hook 26B in a second direction that is different than the first direction. In one embodiment, the second direction is substantially opposite the first direction, so that the hook assembly 16 moves toward the disengaged position 20 which is illustrated in phantom in FIG. 2. When the hook assembly 16 is in the disengaged position 20, the hooks 26A, 26B are no longer substantially concealed within the body cavity 14 (illustrated in FIG. 2) of the lure body 12. Stated another way, in the disengaged position, at least a portion of the one or more hooks 26A, 26B is exposed to the predator. In yet another embodiment, each hook 26A, 26B can be urged by a separate bias 30.

The force exerted by the bias 30 on the hooks 26A, 26B can vary depending upon the design requirements of the fishing lure assembly 10. The bias 30 can be formed from various gauges of metal wire, for example. However, any suitable material having the required strength, flexibility and resiliency can be used for the bias 30.

The latch 32 retains one or more of the hooks 26A, 26B so that the hook assembly 16 is at least partially in the engaged position 18. Stated another way, the latch 32 counteracts the force of the bias 30, and inhibits movement of one or more of the hooks 26A, 26B toward the first position and/or the second position, respectively. However, each hook 26A, 26B can be separately movable relative to the latch 32 and/or the assembly body 24, as explained below. Stated another way, the first hook 26A can be engaged by the latch 32, while the second hook 26B is not engaged by the latch 32.

The design of the latch 32 can be varied. In the embodiment illustrated in FIG. 3, the latch 32 includes a latch support 48 (illustrated partially in phantom) and a latch body 50. The latch support 48 is secured to and supports the latch body 50. The latch support 48 can cantilever from the shaft 28 or from another portion of the hook assembly 16 or the lure body 12. For example, the latch support can include one or more turns about the shaft 28. In an alternative embodiment, the latch support 48 can be formed as a unitary structure with the latch body 50.

Figure 4:
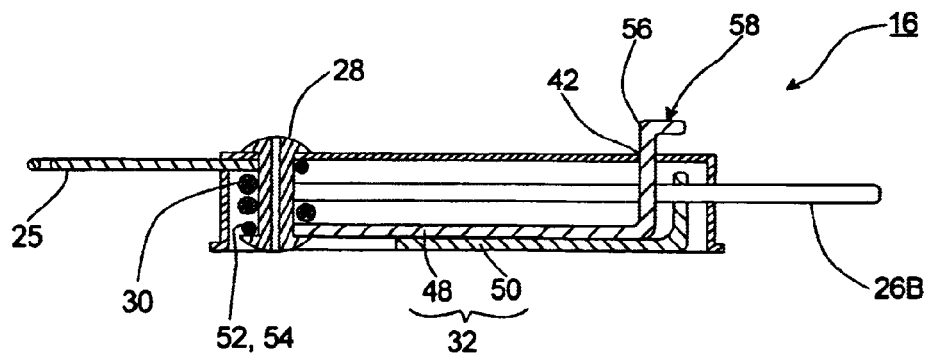
FIG. 4 is a cross-sectional view of the hook assembly taken on line 4—4 in FIG. 3.

FIG. 4 is a cross-sectional view of the hook assembly 16 illustrated in FIG. 3. In this embodiment, portions of (i) the line attachment 25, (ii) the bias 30, and (iii) the latch 32 are each secured to and/or are positioned around the shaft 28. In an alternative embodiment, one or more of the line attachment 25, the bias 30 and the latch 32 can be formed as a unitary structure, and can be secured to and/or positioned around the shaft 28.

Further, in one embodiment, the latch support 48 includes a latch bias 52, a first end 54 and a second end 56. In this embodiment, the latch bias 52 is positioned at or near the first end 54 of the latch support 48. Alternatively, the latch bias 52 can be located away from the first end 54. The latch bias 52 can be a spring that is positioned near or around the shaft 28, and can bias the latch body 50 in a third direction that is different than the first and/or second directions. In one embodiment, the latch bias 52 biases the latch body 50 in a direction that is substantially perpendicular to the first direction and/or the second direction.

The second end 56 of the latch support 48 extends through the latch aperture 42 of the assembly body 24. The second end 56 includes a somewhat L-shaped catch 58 that inhibits the second end 56 from withdrawing completely from the latch aperture 42. As explained below, the catch 58 limits the range of motion of the latch support 48, and thus the latch body 50 relative to the hooks (only hook 26B is illustrated in FIG. 4).

Figure 5A:
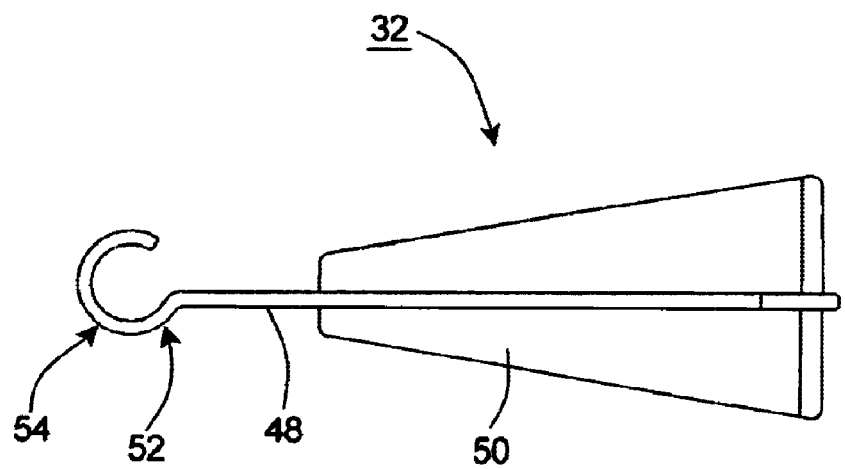
FIG. 5A is a top view of a latch of the hook assembly illustrated in FIG. 3.

FIG. 5A is a detailed top view of one embodiment of the latch 32. In this embodiment, the latch 32 includes the latch support 48 and the latch body 50. The latch support 48 includes the latch bias 52 wherein the first end 54 is arc-shaped or circular-shaped. In this embodiment, the first end 54 can be positioned around the shaft 28 (illustrated in FIG. 4). The latch support 48 can be somewhat tubular in shape, and can be formed from any suitably strong and resilient material, such as metal wire, plastic and the like. In the embodiment illustrated in FIG. 5A, the latch body 50 is somewhat trapezoidal in shape. However, the latch body 50 can be formed into any suitable shape.

Figure 5B:
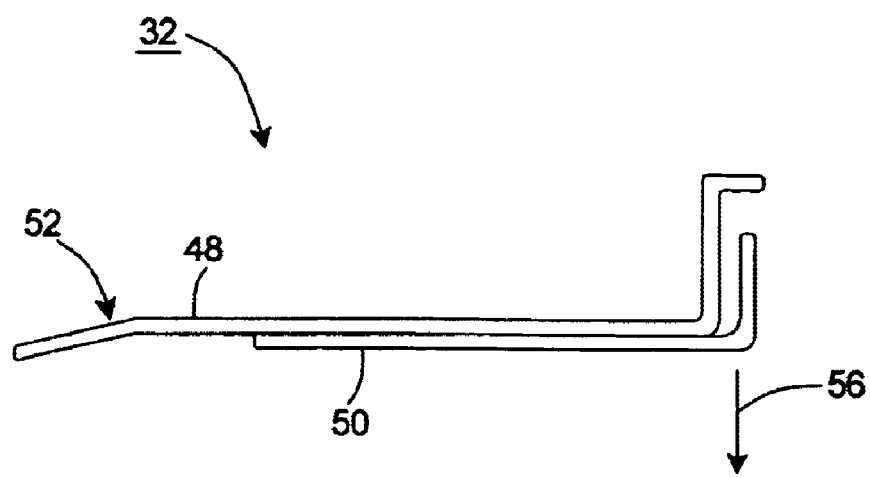
FIG. 5B is a side view of the latch illustrated in FIG. 5A.

FIG. 5B is a side view of the latch 32, including the latch support 48 and the latch body 50. In this embodiment, the latch support 48 includes the latch bias 52, which when positioned around the shaft 28 (illustrated in FIG. 4), causes the latch support 48, and thus the latch body 50 to be biased in a third direction (indicated by arrow 56). Further, in this embodiment, the latch body 50 has a somewhat L-shaped cross-section, although any suitable configuration for the latch body 50 can be utilized.

Figure 6A:
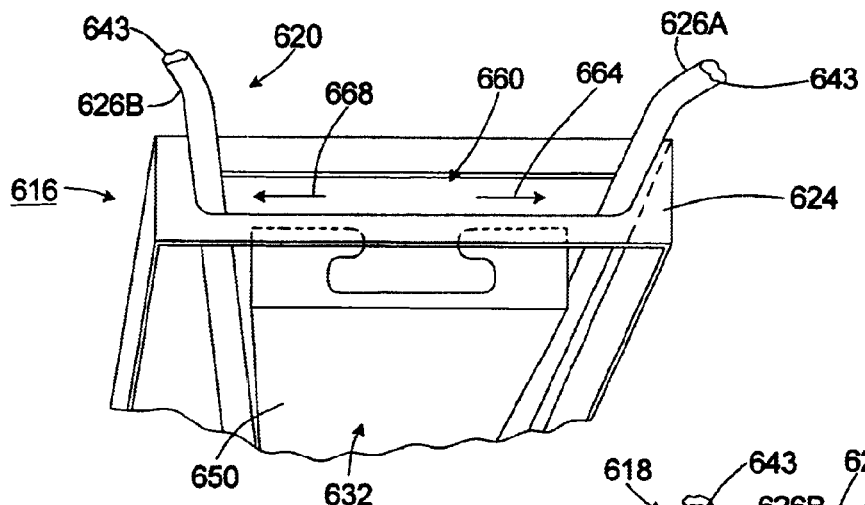
FIG. 6A is a partially cutaway, perspective view of an embodiment of a portion of the hook assembly in a disengaged position.

FIG. 6A is a partially cutaway, perspective view of an embodiment of the hook assembly 616 in the disengaged position 620. In this embodiment, the hook assembly 616 includes the assembly body 624, the hooks 626A, 626B, and the latch 632. The latch 632 includes the latch body 650 (the latch support 48 has been omitted for clarity). In the disengaged position 620, a greater portion of each hook 626A, 626B is exposed to engage the predator. As explained below, the hook assembly 616 moves from the engaged position 618 (illustrated in FIG. 6B) to the disengaged position 620 when the predator exerts direct or indirect pressure on the hook section 643 (partially illustrated in FIG. 6A) of one or more of the hooks 626A, 626B.

In the embodiment illustrated in FIG. 6A, the assembly body 624 includes a hook guide 660, which extends laterally along the width of the assembly body 624. The hook guide 660 guides movement of the hooks 626A, 626B between the disengaged position 620 and the engaged position 618. In the disengaged position 620, the latch body 650 has been biased by the latch support 48 in a direction that is different than the direction of movement of the hooks 626A, 626B along the hook guide 660. In one embodiment, the latch body 650 has been biased in a direction that is substantially perpendicular to the direction of movement of the hooks 626A, 626B along the hook guide 660.

Moreover, in the disengaged position 620, the latch body 650 is positioned so that it does not impede movement of the hooks 626A, 626B along the hook guide 660. Additionally, in the disengaged position 620, the hooks 626A, 626B are urged by the bias 30 (illustrated in FIG. 4) toward the first direction (indicated by arrow 664) and the second direction (indicated by arrow 668), respectively.

Figure 6B:
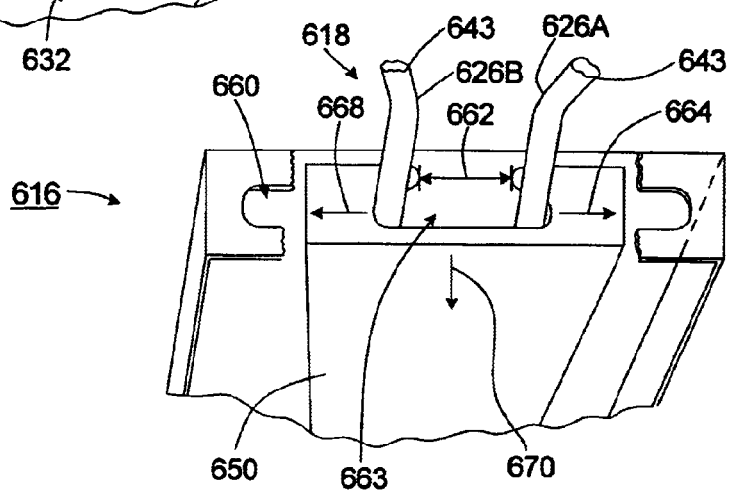
FIG. 6B is a partially cutaway, perspective view of the portion of the hook assembly in FIG. 6A in an engaged position.

FIG. 6B is a partially cutaway, perspective view of the hook assembly 616 in the engaged position 618. In the engaged position 618, the hooks 626A, 626B have been moved towards each other, away from the first position and the second position, respectively. For example, the user of the fishing lure assembly 10 (illustrated in FIG. 2) can manually push the hooks 626A, 626B towards each other. Further, the latch body 650 has been moved upwards, in a direction toward the hooks 626A, 626B. By the user simultaneously moving the hooks 626A, 626B towards each other, and moving the latch body 650 upwards, the latch body can thereby retain the one or more of the hooks 626A, 626B in the engaged position 618.

In the embodiment illustrated in FIG. 6B, the shape of the latch body 650 allows the latch body 650 to temporarily oppose the bias force of the hooks 626A, 626B. The latch body 650 includes a hook opening 662 and a hook retainer 663. One or more of the hooks 626A, 626B moves through the hook opening 662 and into the hook retainer 663, e.g. into the engaged position 618.

In the engaged position 618, each hook 626A, 626B is inhibited from becoming disengaged until pressure is exerted on the hook section 643 (partially illustrated in FIG. 6B) of each such hook 626A, 626B in a direction that is different than the bias of the particular hook 626A, 626B. For example, in one embodiment, the first hook 626A can become disengaged from the latch body 650 by pressure being exerted on the hook section 643 of the first hook 626A from the jaws or other body parts of a predator in a direction that is different than the force exerted by the bias 30 (illustrated in FIG. 4) on the first hook 626A in the first direction 664. The pressure can be direct, e.g. direct pressure by the predator on the hook section 643, or indirect, e.g. pressure by the predator on the lure body 12 (illustrated in FIG. 2), which causes pressure on the hook section 643.

Somewhat similarly, the second hook 626B can become disengaged from the latch body 650 by pressure being exerted on the second hook 626B in a direction that is different than the force exerted by the bias 30 on the second hook 626B in the second direction 668. In another embodiment, one or more of the hooks 626A, 626B can become disengaged when pressure is exerted on the one or more hooks 626A, 626B in a direction that is substantially opposite the force exerted by the bias 30 on the one or more hooks 626A, 626B.

In another embodiment, both hooks 626A, 626B can become simultaneously disengaged from the latch body 650 by pressure being exerted to move the hooks 626A, 626B substantially towards each other. Once the hooks 626A, 626B are moved towards each other, the latch support 48 (illustrated in FIG. 5B) biases the latch body 650 away from the hooks 626A, 626B (indicated by arrow 670), and the hooks 626A, 626B are free to move laterally away from each other along the hook guide 660 (only a portion of the hook guide is illustrated in FIG. 6B) toward the disengaged position 620 (illustrated in FIG. 6A). The extent of the pressure required to move the hooks 626A, 626B towards each other can be varied depending upon the design requirements of the fishing lure assembly 10. Further, the necessary pressure can be the result of direct pressure on the hooks 626A, 626B that is exerted by the predator.

Figure 7:
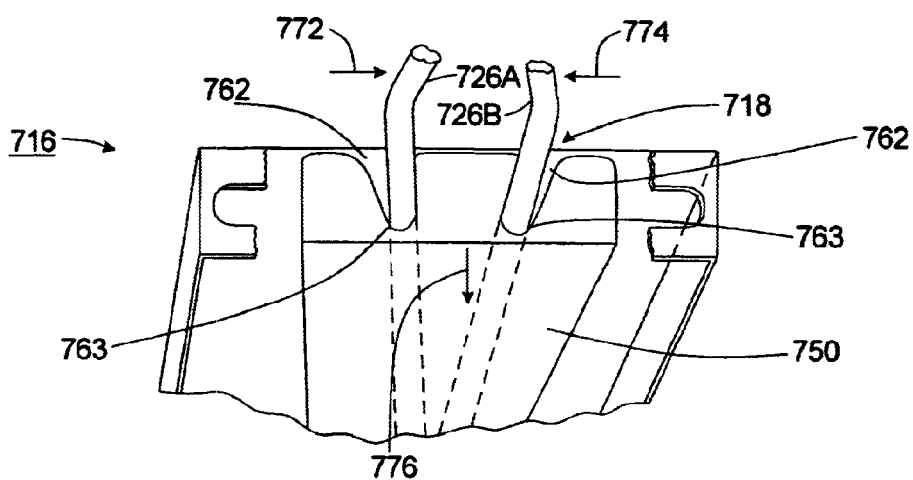
FIG. 7 is a partially cutaway, perspective view of another embodiment of a portion of the hook assembly in the engaged position.

FIG. 7 is a cutaway perspective view of another embodiment of the hook assembly 716 in the engaged position 718. In this embodiment, the hooks 726A, 726B cross over and overlap each other when in the engaged position 718. The latch body 750 includes a plurality of hook openings 762 and hook retainers 763. Further, in the embodiment illustrated in FIG. 7, the first hook 726A is urged in the first direction (indicated by arrow 772), and the second hook 726B is urged in the second direction (indicated by arrow 774). The latch body 750 is biased in a third direction (indicated by arrow 776) that is different than the first direction 772 and/or the second direction 774. In one embodiment, the third direction 776 is substantially perpendicular to the first direction 772 and/or the second direction 774.

While the particular fishing lure assembly 10 as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A hook assembly for use in a fishing lure assembly for catching a predator, the hook assembly comprising:
   a first hook;
   a second hook;
   a bias that urges the first hook in a first direction and the second hook in a second direction that is different than the first direction;
   a latch that selectively inhibits movement of the first hook in the first direction; wherein pressure on the first hook in a direction that is substantially opposite the first direction releases the first hook from the latch, allowing the first hook to move in the first direction; and
   a positioner that retains the position and is in direct contact with at least a portion of each of the bias and the latch.

2. The hook assembly of claim 1 wherein the second direction is substantially opposite the first direction.

3. The hook assembly of claim 1 wherein the latch selectively inhibits movement of the second hook in the second direction.

4. The hook assembly of claim 3 wherein pressure on the second hook in a direction that is substantially opposite the second direction releases the second hook from the latch, allowing the second hook to move in the second direction.

5. The hook assembly of claim 3 wherein pressure on the first hook substantially toward the second hook causes the latch to release the first hook, allowing the bias to move the first hook in the first direction.

6. The hook assembly of claim 5 wherein pressure on the second hook substantially toward the first hook causes the latch to release the second hook, allowing the bias to move the second hook in the second direction.

7. The hook assembly of claim 1 wherein the first hook, the second hook and the bias are formed as a unitary structure.

8. The hook assembly of claim 1 wherein the first hook includes a curved, first hook section and the second hook includes a curved, second hook section, and wherein pressure on the first hook section substantially toward the second hook and pressure on the second hook section substantially toward the first hook causes the latch to release the hooks, allowing the bias to move the first hook in the first direction and the second hook in the second direction.

9. The hook assembly of claim 1 wherein the bias includes a spring.

10. The hook assembly of claim 1 wherein the latch is biased in a third direction that is substantially perpendicular to the first direction.

11. The hook assembly of claim 10 wherein the latch includes a hook opening, the latch moving in the third direction to release the first hook when the first hook is aligned with the hook opening.

12. The hook assembly of claim 1 wherein the first hook includes a curved, first hook-shaped section having a tapered end, and wherein the pressure is applied to the first hook-shaped section to release the first hook from the latch.

13. A fishing lure assembly including (i) a lure body that defines a body cavity, and (ii) the hook assembly of claim 1, wherein at least a portion of the hook assembly is positioned within the body cavity.

14. A hook assembly for use in a fishing lure assembly for catching a predator, the hook assembly comprising:
   a first hook including a curved, first hook section having a tapered end;
   a second hook including a curved, second hook section having a tapered end;

a bias that urges the first hook in a first direction and the second hook in a second direction that is different than the first direction;

a latch that selectively inhibits movement of the first hook in the first direction; wherein pressure on the first hook section in a direction substantially toward the second hook section releases the first hook from the latch, allowing the first hook to move in the first direction; and a positioner that retains the position and that is in direct contact with at least a portion of each of the bias and the latch.

15. The hook assembly of claim 14 wherein the second direction is substantially opposite the first direction.

16. The hook assembly of claim 14 wherein the latch selectively inhibits movement of the second hook in the second direction.

17. The hook assembly of claim 16 wherein pressure on the second hook section in a direction that is substantially opposite the second direction releases the second hook from the latch, allowing the second hook to move in the second direction.

18. The hook assembly or claim 16 wherein pressure on the first hook section substantially toward the second hook and pressure on the second hook section substantially toward the first hook causes the latch to release the hooks, allowing the bias to move the first hook in the first direction and the second hook in the second direction.

19. The hook assembly of claim 14 wherein the first hook, the second hook and the bias are formed as a unitary structure.

20. The hook assembly of claim 14 wherein the bias includes a spring.

21. The hook assembly of claim 14 wherein latch is biased in a third direction that is substantially perpendicular to the first direction.

22. The hook assembly of claim 21 wherein the latch selectively inhibits movement of the second hook in the second direction, and wherein the latch includes a hook opening, the latch moving in the third direction to release the hooks when the hooks are aligned with the hook opening.

23. A fishing lure assembly including (i) a lure body that defines a body cavity, and (ii) the hook assembly of claim 14, wherein at least a portion of the hook assembly is positioned within the body cavity.

24. A fishing lure assembly for catching a predator, the fishing lure assembly comprising:

a lure body that defines a body cavity and a hook assembly including (i) a first hook including a curved, first hook section having a tapered end, (ii) a bias that urges the first hook in a first direction, (iii) a latch that selectively inhibits movement of the first hook in the first direction, and (iv) a positioner that retains the position and is in direct contact with at least a portion of each or the bias and the latch, wherein pressure on the first hook section in a direction that is substantially opposite the first direction releases the first hook from the latch, allowing the first hook to move in the first direction, and wherein the tapered end of the first hook is positioned substantially within the body cavity when the latch inhibits movement of the first hook in the first direction.

25. The fishing lure assembly of claim 24 wherein at least a portion of the first hook is positioned substantially outside the body cavity when the first hook is released from the latch.

26. A fishing lure assembly for catching a predator, the fishing lure assembly comprising:

a lure body;

a first hook that moves between a first engaged position substantially within the lure body and a first disengaged position at least partially external to the lure body;

a bias that urges the first hook in a first direction;

a latch that selectively retains the first hook in the first engaged position, the latch including a hook opening that receives the first hook so that the latch retains the first hook in the first engaged position; and a positioner that retains the position and is in direct contact with at least a portion of each of the bias and the latch;

wherein pressure on the first hook in a direction that is substantially opposite the first direction aligns the first hook with the hook opening to release the first hook from the latch, allowing the first hook to move in the first direction to the first disengaged position.

27. The fishing lure assembly of claim 26 further comprising a second hook, the bias urging the second hook in a second direction that is different than the first direction.

28. The fishing lure assembly of claim 27 wherein the second hook moves between a second engaged position substantially within the lure body and a second disengaged position at least partially external to the lure body.

29. The fishing lure assembly of claim 28 wherein the latch selectively retains the second hook in the second engaged position, the latch including a hook opening that receives the second hook so that the latch retains the second hook in the second engaged position.

30. The fishing lure assembly of claim 29 wherein pressure on the second hook in a direction that is different than the second direction aligns the second hook with the hook opening to release the second hook from the latch, allowing the second hook to move in the second direction to the second disengaged position.

31. The fishing lure assembly of claim 26 wherein the latch includes a spring that biases the latch in a third direction that is substantially perpendicular to the first direction.

32. The fishing lure assembly of claim 26 further comprising a hook guide that guides movement of the first hook between the first engaged position and the first disengaged position.

* * * * *

UNITED STATES PATENT AND TRADEMARK OFFICE
CERTIFICATE OF CORRECTION

PATENT NO. : 6,941,695 B2
DATED : September 13, 2005
INVENTOR(S) : Minegar

It is certified that error appears in the above-identified patent and that said Letters Patent is hereby corrected as shown below:

Title page,
Item [56], References Cited, U.S. PATENT DOCUMENTS,
please replace the name "Walter" with -- Clayton --; and
please replace the name "Lee" with -- Johns --.

Column 9,
Line 48, please insert -- ; -- after "cavity".

Signed and Sealed this

Eighth Day of November, 2005

JON W. DUDAS
*Director of the United States Patent and Trademark Office*